(12) United States Patent
Wilcox et al.

(10) Patent No.: US 8,078,060 B2
(45) Date of Patent: Dec. 13, 2011

(54) OPTICAL SYNCHRONIZATION SYSTEM FOR FEMTOSECOND X-RAY SOURCES

(75) Inventors: Russell B. Wilcox, El Cerrito, CA (US); Ronald Holzwarth, Munich (DE)

(73) Assignee: The Regents of The University of California, Oakland, CA (US)

( * ) Notice: Subject to any disclaimer, the term of this patent is extended or adjusted under 35 U.S.C. 154(b) by 1066 days.

(21) Appl. No.: 11/696,591

(22) Filed: Apr. 4, 2007

(65) Prior Publication Data

US 2008/0043784 A1 Feb. 21, 2008

Related U.S. Application Data

(60) Provisional application No. 60/744,218, filed on Apr. 4, 2006.

(51) Int. Cl.
H04B 10/00 (2006.01)
(52) U.S. Cl. .......... 398/154; 398/150; 398/155
(58) Field of Classification Search ........... 398/146–155
See application file for complete search history.

(56) References Cited

U.S. PATENT DOCUMENTS

| | | | |
|---|---|---|---|
| 4,287,606 A | 9/1981 | Frosch et al. | |
| 5,031,234 A | 7/1991 | Primas et al. | |
| 5,267,072 A | 11/1993 | Maleki | |
| 5,367,529 A | 11/1994 | Holsinger et al. | |
| 5,673,133 A | 9/1997 | Imaoka et al. | |
| 6,687,270 B1 | 2/2004 | Robertson | |
| 6,831,935 B2 | 12/2004 | Ye et al. | |
| 2003/0185255 A1* | 10/2003 | Ye et al. | 372/18 |
| 2005/0265406 A1* | 12/2005 | Kaertner et al. | 372/30 |
| 2005/0271094 A1* | 12/2005 | Miller et al. | 372/25 |
| 2006/0141681 A1* | 6/2006 | Sun et al. | 438/132 |
| 2006/0153254 A1* | 7/2006 | Franjic et al. | 372/30 |
| 2006/0263096 A1* | 11/2006 | Dinu et al. | 398/187 |

OTHER PUBLICATIONS

Bartels et al., "Mode-Locked Laser Pulse Trains with Subfemtosecond Timing Jitter Synchronized to an Optical Reference Oscillator", Optics Letters, vol. 28 (No. 8), p. 663- 665, (Apr. 15, 2003).
Frisch et al., "A High Stability, Low Noise RF Distribution System", Proceedings of the 2001 Particle Accelerator Conference, p. 816-818, (2001).
Kärtner et al., "Progress in Large-Scale Femtosecond Timing Distribution and RF-Synchronization", Proceedings of 2005 Particle Accelerator Conference, p. 284-288, (2005).

(Continued)

Primary Examiner — Dzung Tran
(74) Attorney, Agent, or Firm — Fulbright & Jaworski L.L.P.

(57) ABSTRACT

Femtosecond pump/probe experiments using short X-Ray and optical pulses require precise synchronization between 100 meter-10 km separated lasers in a various experiments. For stabilization in the hundred femtosecond range a CW laser is amplitude modulated at 1-10 GHz, the signal retroreflected from the far end, and the relative phase used to correct the transit time with various implementations. For the sub-10 fsec range the laser frequency itself is upshifted 55 MHz with an acousto-optical modulator, retroreflected, upshifted again and phase compared at the sending end to a 110 MHz reference. Initial experiments indicate less than 1 fsec timing jitter. To lock lasers in the sub-10 fs range two single-frequency lasers separated by several teraHertz will be lock to a master modelocked fiber laser, transmit the two frequencies over fiber, and lock two comb lines of a slave laser to these frequencies, thus synchronizing the two modelocked laser envelopes.

14 Claims, 7 Drawing Sheets

OTHER PUBLICATIONS

Payne et al., "Photonic Techniques for Local Oscillator Generation and Distribution in Millimeter-Wave Radio Astronomy", Int. Topical Meeting on Microwave Photonics 2002, p. 9-12, (2002).

Shelton et al., "Subfemtosecond Timing Jitter Between Two Independent, Actively Synchronized, Mode-locked Lasers", Optics Letters, vol. 27 (No. 5), p. 312-314, (Mar. 1, 2002).

Wilcox et al., "Optical Synchronizations Systems for Femtosecond X-Ray Sources", Particle Accelerator Conference 2005, p. 3958-3960, (May 2005).

Wilcox et al., "Synchronizing Lasers Over Fiber by Transmitting Continuous Waves", CLEO/QELS Conference 2007, 4 pages, (2007).

Coddington et al., "Coherent Optical Link Over Hundreds of Metres and Hundreds of Terahertz with Subfemtosecond Timing Jitter", nature Photonics, vol. 1, p. 283-287, (May 2007).

Daussy et al, "Long-Distance Frequency Dissemination with a Resolution of $10^{-17}$", Physical Review Letters, Vol. 94, p. 203904, (2005).

Holman et al., "Precise Frequency Transfer Through a Fiber Network by use of 1.5-µm Mode-Locked Sources", Optics Letters, vol. 29 (No. 13), p. 1554-1556, (Jul. 2004).

Holman et al., "Remote Transfer of a High-Stability and Ultralow-Jitter Timing Signal", Optics Letters, vol. 30 (No. 10), p. 1225-1227, (May 2005).

Hudson et al., "Synchronization of Mode-Locked Femtosecond Lasers Through a Fiber Link", Optics Letters, vol. 31 (No. 13), p. 1951-1953, (Jul. 2006).

Kim et al., "Long-term Femtosecond Timing Link Stabilization Using a Single-Crystal Balanced Cross Correlator", Optics Letters, vol. 32 (No. 9), p. 1044-1046, (May 2007).

Kubina et al., "Long Term Comparison of Two Fiber Based Frequency Comb Systems", Optics Express, vol. 13 (No. 3), p. 904-909, Feb. 2005).

Shillue, "High-Frequency Local Oscillator Transmission for the Atacama Large Millimeter Array (ALMA)", IEEe LEOS Summer Topical Meetings 2005, p. 1-2, (2005).

Swann et al., "Fiber-Laser Frequency Combs with Subhertz Relative Linewidths", Optics Letters, vol. 31 (No. 20), p. 3046-3048, (Oct. 2006).

Yoshitomi et al., "Ultralow-jitter Passive Timing Stabilization of a Mode-Locked Er-doped Fiber Laser by Injection of an Optical Pulse Train", Optics Letters, vol. 31 (No. 22), p. 3243-3245, (Nov. 2006).

* cited by examiner

IMPLEMENTATION WITH MECHANICAL DELAY

IMPLEMENTATION WITH ELECTRO-OPTIC PHASE SHIFTERS

OPTICAL SYNCHRONIZATION SYSTEM FOR FEMTOSECOND X-RAY SOURCES

CROSS-REFERENCE TO RELATED APPLICATIONS

This application claims benefit of priority to U.S. provisional patent application 60/744,218 filed Apr. 4, 2006, entitled "Optical Synchronization System for Femtosecond X-ray Sources", which is hereby incorporated by reference in its entirety.

STATEMENT OF GOVERNMENTAL SUPPORT

This invention was made during work supported by U.S. Department of Energy under Contract No. DE-AC02-05CH11231. The government has certain rights in this invention.

REFERENCE TO SEQUENCE LISTING, TABLE, OR COMPUTER PROGRAM APPENDIX

Not applicable.

BACKGROUND OF THE INVENTION

1. Field of the Invention

The present invention relates generally to synchronization, more specifically to synchronization of laser systems, and most specifically to synchronization of laser systems with femtosecond synchronization levels.

2. Related Art

Previous methods of synchronization of pulsed lasers have employed transmission of short pulses, or high frequency RF signals, or single optical frequencies. These methods have demonstrated low timing jitter between lasers, but have relative disadvantages. Transmitting short pulses for timing requires the pulses remain short in duration while being transmitted over long distances in fiber. Such transmission tends to broaden the pulses and distort temporal information. Synchronization using high RF frequencies requires transmission over electrical cable or fiber. Stabilization of the temporal delay in electrical cable is limited by phase detection of the RF signal to hundreds of femtoseconds, while transmission of RF over fiber requires optical-to-electrical conversion, which is unstable and susceptible to noise. Transmission using single optical frequencies requires that the lasers to be synchronized are stabilized with respect to the frequency offset between the carrier and the pulse envelope. This may not be possible for many lasers that need to be synchronized to the sub-10 fs regime.

BRIEF SUMMARY OF THE INVENTION

In one embodiment, a high accuracy optical synchronization system comprises: a) an input laser capable of generating an input laser signal, with an associated input laser signal frequency; and b) means for synchronizing within a few femtoseconds the input laser signal among a plurality of synchronized lasers with or without temporal offset. The few femtoseconds may be selected from one or more of a set of: <1 fs, 1±0.25 fs, and 1-10 fs.

The means for synchronizing may comprise: a) locking a first wavelength $\lambda_1$ to a first frequency component of the input laser signal to a first continuous wave laser operating at wavelength $\lambda_1$; b) locking a second wavelength $\lambda_2$ to a second frequency component of the input laser signal to a second continuous wave laser operating at wavelength $\lambda_2$; and c) transmitting to one or more distant laser systems to be temporally locked to the input laser: i) a $\lambda_1$ output from the first continuous wave laser operating at wavelength $\lambda_1$ and ii) a $\lambda_2$ output from the second continuous wave laser operating at wavelength $\lambda_2$.

The high accuracy optical synchronization system above may have distant laser systems at a distance selected from a group of distance consisting of: >100 m, >1 km, >3 km, >4 km, >6 km, and >10 km.

The transmitting step above may comprise: a) combining the $\lambda_1$ output and the $\lambda_2$ output into a single fiber for remote transmission.

In another embodiment, the high accuracy optical synchronization system may also comprise: a) controlling a temporal skew between the input laser and one or more of the synchronized lasers by temporally shifting the $\lambda_1$ output and the $\lambda_2$ output through: i) a mechanical delay system; or ii) an electro optical phase shifter system.

An apparatus may be built that is capable of performing the steps of the high accuracy optical synchronization system described above.

In an alternate embodiment, the high accuracy optical synchronization system may comprise: a) an input laser capable of generating an input laser signal, with an associated input laser signal frequency; and b) a means for synchronizing the input laser signal among a plurality of devices with a temporal offset. The temporal offset may be in fact no temporal offset, or may be many nanoseconds.

The high accuracy optical synchronization system above may have accuracies of the few femtosecond measurements that are selected from one or more of a set of: i) <1 fs, ~1 fs, and 1-10 fs. Additionally, increased temporal offsets may be achieved by variations of the test and reference optical path lengths, as well as the optical speed differences in the media used. In this manner, the few femtoseconds may be determined after an input fixed offset.

In another embodiment, the high accuracy optical synchronization system input laser signal may be frequency shifted. The frequency shift is selected from one or more of a set of: doubling, tripling, quadrupling, and an acousto-optical frequency shifter.

In another embodiment, the high accuracy optical synchronization system may comprise: a) an input laser capable of generating an input laser signal, with an associated input laser signal frequency; and b) means for synchronizing the input laser signal among a plurality of devices with or without temporal offset. In this manner the means for synchronizing are disclosed within this document, and their equivalents.

In an alternate embodiment, two spectral lines of two pulsed lasers are compared and used for synchronization control of their pulse trains. FIG. 1 shows how the frequency comb lines of two pulsed lasers may be compared. Two of the frequencies of one laser are compared with two nearby frequencies of the other. By small adjustments of the second laser, its frequencies can be matched in phase with the first, thus synchronizing the two. This invention thus comprises: a means for generating two optical frequencies; a means for transmitting the two frequencies; a laser to be synchronized; and a means for comparing the two frequencies to two comb frequencies of the laser to be synchronized.

One way to generate two optical frequencies suitable for synchronizing pulsed lasers is to have a pulsed master clock laser. Two frequencies can be derived from the master clock in various ways, e.g. by filtering or locking slave lasers. In one embodiment, one of the CW lasers serves as an absolute frequency reference, locking one of the master lasers to that single frequency, while another CW laser is locked to another of the master laser's comb lines. Alternatively, two slave single frequency CW lasers can be locked via interferometers to two of the master laser's comb lines. If the two CW lasers can be independently operated at stable frequencies (e.g. by using atomic or molecular frequency standards), then they can act as the master synchronization source for multiple pulsed lasers, without the need for a master clock. Since a mode locked laser is an excellent source of well synchronized spectral lines, this is the preferred source, and subsequent descriptions will show a mode locked master clock laser.

The synchronized lasers may be compared with the master clock or with each other, depending on the number of lasers and their configuration.

Locking of the optical frequencies of two lasers is accomplished by a well-known technique. Light from both the clock and the CW laser is interfered on a photodiode or some other intensity detector, and the difference frequency is observed as an RF frequency. The phase of this signal is compared with a reference and a DC signal is derived that controls the optical frequency of whichever laser is being controlled. This is the familiar optical phase lock loop method of controlling lasers.

Once two frequencies that represent the timing information are generated, they must be transmitted. The preferred way to do this is via fiber optic, although they could be transmitted via free space beams or though other types of waveguides such as planar waveguides or lens waveguides. The transmitting medium must itself be stabilized in timing delay, and there is a preferred way to do this by using interferometric stabilization of an optical fiber. This method delivers accurate phase information to the end point, which is what is required. The stable single frequency to be transmitted is also used as a measurement of the phase delay through the transmitting optical fiber, by making the fiber one arm of an interferometer. The frequency is reflected from the receiving end of the fiber and compared back at the source with a reference arm. Any difference in phase is compensated by adjusting the delay through the fiber. Both fibers may be transmitted through one fiber, or they may be transmitted through two or more fibers, each of which is stabilized.

Once transmitted, the two frequencies are received by interferometers connected to the laser to be synchronized. This process is essentially the reverse of the transmitting process. Each of the two frequencies is interfered with light from the synchronized pulsed laser, yielding the difference frequency and phase. This is used to control the frequencies of the pulsed laser and thus its repetition rate. In this way the synchronized laser is made to follow the timing of the clock laser.

DETAILED DESCRIPTION OF THE PREFERRED EMBODIMENT

Introduction

Figure 1:
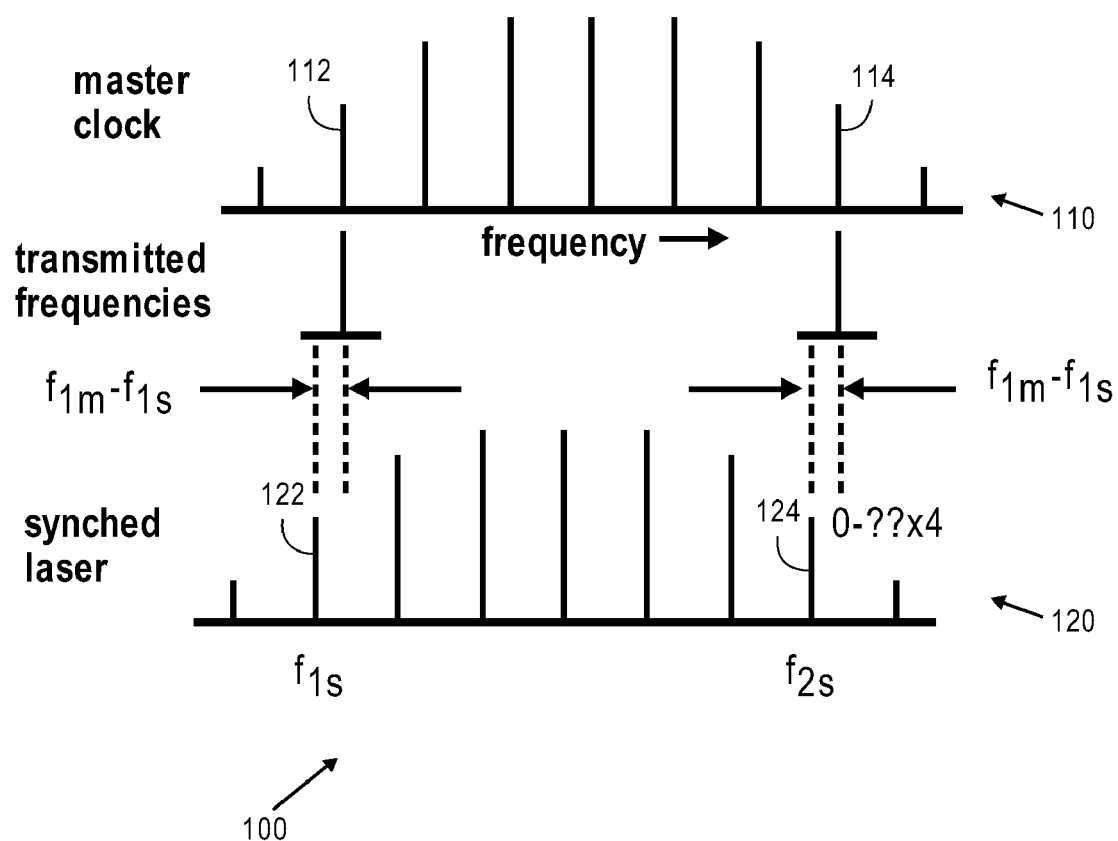
FIG. 1 shows how the frequency comb lines of two pulsed lasers may be compared to obtain a high degree of synchronization.

Synchronization of short pulse lasers to a high degree of accuracy (within a time scale measured in femtoseconds, $10^{-15}$ seconds) is important in various applications, including scientific experiments investigating short time scale phenomena. Several methods exist for sending timing information through optical fiber or coaxial cable in order to provide a synchronizing signal. These methods can be characterized as using either fast temporal modulation of a signal or interferometry. In either case, the degree of temporal synchronization is proportional to the frequency transmitted. Fiber optics can transmit much higher frequencies than coaxial cables and thus achieve higher precision synchronization, so most of the recent work in this area has been with fiber optics.

Using the fast temporal modulation method, some authors have reported fiber optic synchronization systems based on radio frequency (RF) modulation of a continuous wave (CW) laser, transmission through an optical fiber, and detection by a photodiode which recovers the RF modulation (Ref. 1). The transmitted RF signal can then be used to phase synchronize a laser pulse. These schemes have demonstrated about 100 fs of RMS temporal jitter at best, due to the fact that detection accuracy is limited to a certain fraction of the phase angle, and therefore a certain fraction of the transmitted RF period. Since the RF frequency is limited to a few tens of GHz, this limits the temporal resolution of the detection.

Others using temporal modulation have shown that a train of short laser pulses transmitted through a fiber can be used to either derive RF signals for synchronization or can be directly compared (cross-correlated) with the laser pulses to be synchronized (Ref. 2.) Experiments using this scheme to derive RF signals from a transmitted train of pulses have shown between 10-20 fs synchronization between two lasers, one of which is the transmitting laser. Cross-correlation has not yet been done experimentally, but requires a high quality pulse transmitted through the fiber, with the precision of synchronization proportional to the temporal width of the pulse. Transmission of short pulses through fiber is difficult, as nonlinear effects in the fiber will tend to distort and spread the pulse in time, as well as convert some of the pulse energy to other wavelengths. These effects will limit the precision of this scheme, or will require difficult modifications of the fiber transmission system to overcome.

Interferometric methods do not encounter the limitations of the short pulse transmission scheme, yet they can take advantage of the wide bandwidth available in fiber. These methods can be thought of as a comparison between the phases of the comb frequencies emitted by the two lasers.

A laser producing a train of short pulses in the time domain also produces a "comb" of equally spaced frequencies in the spectral domain. If the frequency spectra of two lasers can be matched in phase and frequency at two points, the two lasers will be synchronized.

Refer now to FIG. 1, where comb synchronization of two pulses is shown 100. A master, or reference, clock laser produces a comb of equally spaced frequencies 110 in the frequency domain. One or more frequency components (e.g. Frequencies 112 and/or 114) of the master clock 110 are compared to a laser to be synchronized (not shown) which also produces a comb of equally spaced frequencies 120. One or more frequencies (e.g. 122 and/or 124) are then compared to corresponding frequencies in the master clock comb 110. In detail, this means measuring the phase difference between a first frequency in the master clock and a corresponding frequency in the synchronized clock. A first frequency in the master clock $f_{1m}$ pulse 112 would be compared with the corresponding frequency in the synchronized clock $f_{1s}$ pulse 122. A difference $\Delta f_1$ would be formed between the two $f_{1m}-f_{1s}$. This difference would be minimized so as to synchronize the two clocks. Similarly, with frequencies $f_{2m}$ 114 and $f_{2s}$ 124, a difference $f_{2m}-f_{2s}$ would also be compared and a difference $\Delta f_2$ formed. A third difference $\Delta f_3 = \Delta f_1 - \Delta f_2$ would be formed, which becomes the error signal that measures the relative synchronization between the lasers. This difference would be controlled to be minimized, thus synchronizing the two clocks. This method of taking differences between the phases of frequency components of the two optical combs essentially compares the combs at two widely spaced points. If they are the same at these two points, then they are the same in the phases of their repetition frequencies, and are therefore synchronized in time. Taking successive differences cancels differences in the carrier frequencies of the two lasers, which are irrelevant if the synchronization only needs to be between the envelopes of their pulses.

Two previous authors have shown results using variations of this approach. Shelton synchronized two lasers to less than 2 fs by comparing high harmonics of the repetition rate at 14 GHz (Ref.3.). This harmonic was one of the two necessary frequencies, while the other can be taken to be at zero frequency, a "virtual" comb line. Interference was in the RF, not optical domain. This experiment did not transmit the timing information through a long distance, and required that the lasers be within the same thermal and acoustic envelope, to make any perturbations common mode. In a practical system, the performance would probably be similar to that of the 10-20 fs short pulse scheme mentioned above.

Bartels used an interferometric scheme with a much wider bandwidth, comparing two 400 THz optical frequencies, and achieved less than 2 fs synchronization between two lasers (Ref. 4.). Again, the second frequency in each comb was at zero frequency. In a short pulse laser, the optical frequencies are harmonics of the pulse repetition rate plus an additive factor. This additive factor can be controlled to zero so that the optical frequencies are strictly harmonics of the repetition rate, but this is difficult to do, requiring a laser with very short pulse width and much extra equipment. These controls are also not very reliable at this time. Bartels' scheme requires a laser controlled in this way (carrier/envelope offset stabilized), so that the optical frequencies are simply related to the repetition rate.

The scheme described in this invention uses an interferometric technique, but does not require a specially stabilized laser. Thus, a wider range of lasers can be used, making the synchronization method adaptable to more applications. This scheme takes advantage of the wide bandwidth of fiber, providing robust synchronization that can be transmitted over long distances. Given the results of previous interferometric schemes, it should be possible to achieve RMS errors of a few femtoseconds. At that level, the residual errors are less due to the basic scheme than to other perturbations. If these perturbations are overcome, the intrinsic accuracy of synchronization may be below 1 fs.

Detailed Description

Figure 2:
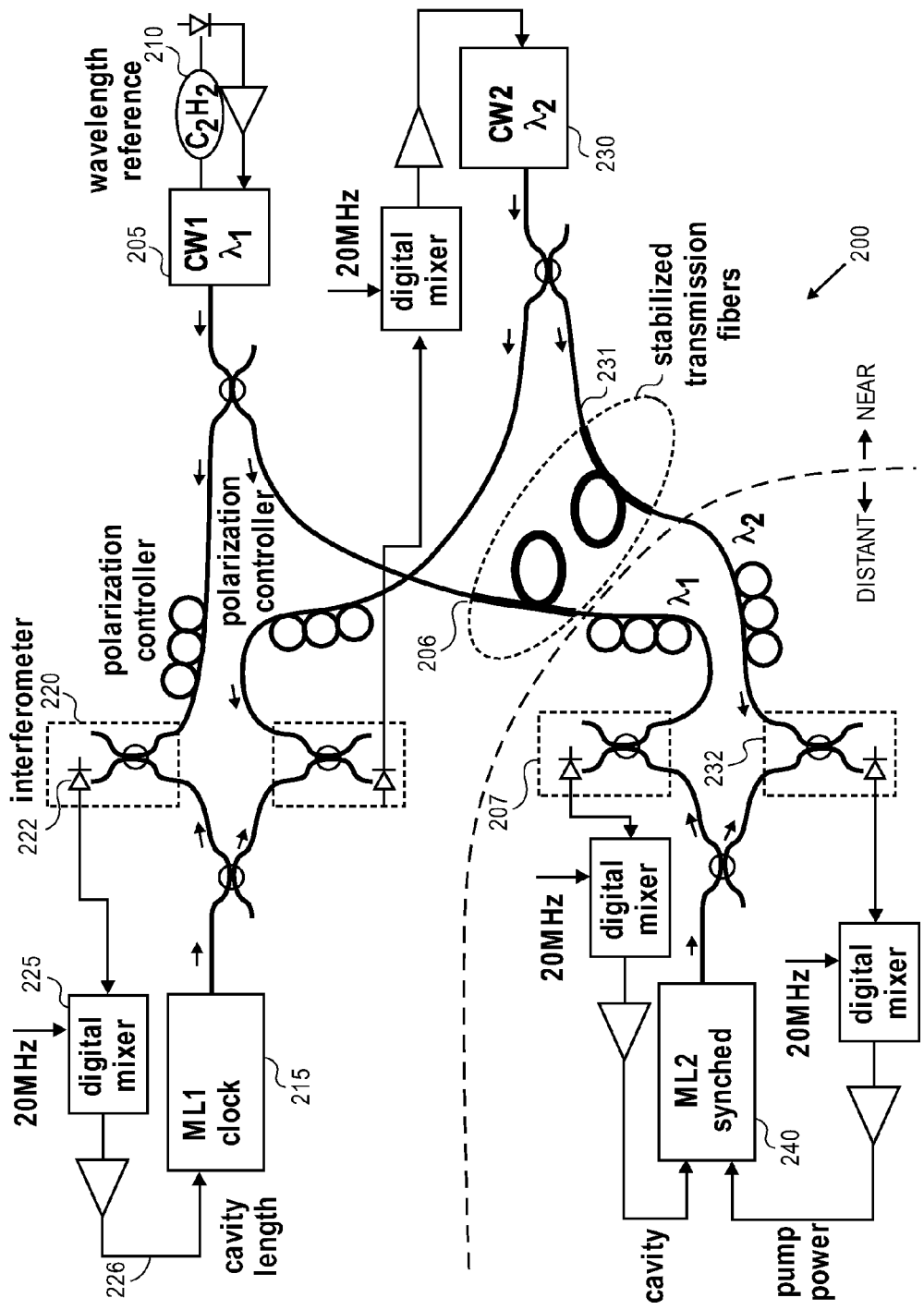
FIG. 2 is a schematic of an embodiment of two synchronized lasers around 1550 nm wavelengths.

Referring now to one embodiment 200 shown in FIG. 2, all lasers are around 1550 nm wavelength, so that fiber optic components are easily obtained. A CW laser 205 (a low noise fiber distributed feedback—or DFB—laser) serves as an absolute frequency reference, locked in frequency to a molecular frequency standard 210 (an acetylene cell) operating at wavelength $\lambda_1$. Let this laser 205 be called CW1. The clock laser 215 is a nonlinear polarization rotation mode locked fiber laser, a type known to have very low phase noise of its repetition frequency. Let this laser 215 be called ML1. Light signals from CW1 and clock laser ML1 215 are sent into a directional coupler 220 and combined so as to be detected on a photodiode 222, which yields an electrical difference frequency output. This difference frequency is compared with a phase reference in a digital mixer 225, where a DC electrical signal 226 is derived (and potentially amplified) which controls the mode locked laser 215 repetition frequency. This is done by driving a piezoelectric element on which a mirror in the cavity of the laser 215 is mounted. As the ML1 repetition rate is changed, the frequency of its comb lines is varied, such that the error signal derived from the optical difference frequency is minimized and the two lasers 215 and 205 are phase locked.

A similar method is used to control the second CW laser 230 (hereafter referred to as CW2), when compared with another comb line of wavelength $\lambda_2$ of the mode locked clock laser 215. The frequency of CW2 is thus the frequency of CW1 plus an integer n times the repetition frequency of ML1. It is advantageous to make n as large as possible, to increase the system sensitivity to changes in relative repetition frequency between the clock and synched lasers. If the two transmitted wavelengths $\lambda_1$ and $\lambda_2$ are too close, a small change in the repetition rate of the synched laser 240 (hereafter called ML2) will result in a small phase error when the comb lines of ML2 240 are compared with the transmitted wavelengths $\lambda_1$ and $\lambda_2$. If the transmitted frequencies are spaced far apart, a small change in ML2's 240's repetition rate will result in a larger change in phase of the compared optical wavelengths, and this allows for greater loop gain for control. The two frequencies in a preferred embodiment are 5 THz, chosen for convenience in obtaining fiber optic components, and in generating wavelengths from the mode locked fiber laser.

In one embodiment, the two wavelengths $\lambda_1$ and $\lambda_2$ from single frequency lasers CW1 205 and CW2 230 are transmitted via two separate fiber optics 206 and 231 respectively of lengths ranging from a few meters, to 4 km, to as much as 10 km using currently available lasers. Improvements in laser technology can allow for increase in the transmission distance, which is limited mainly by the coherence length of the continuous wave (CW) lasers. Each fiber is stabilized using an interferometer 207 and 232 respectively that employs the fiber as one arm to be compared with a reference arm as described below.

Figure 3:
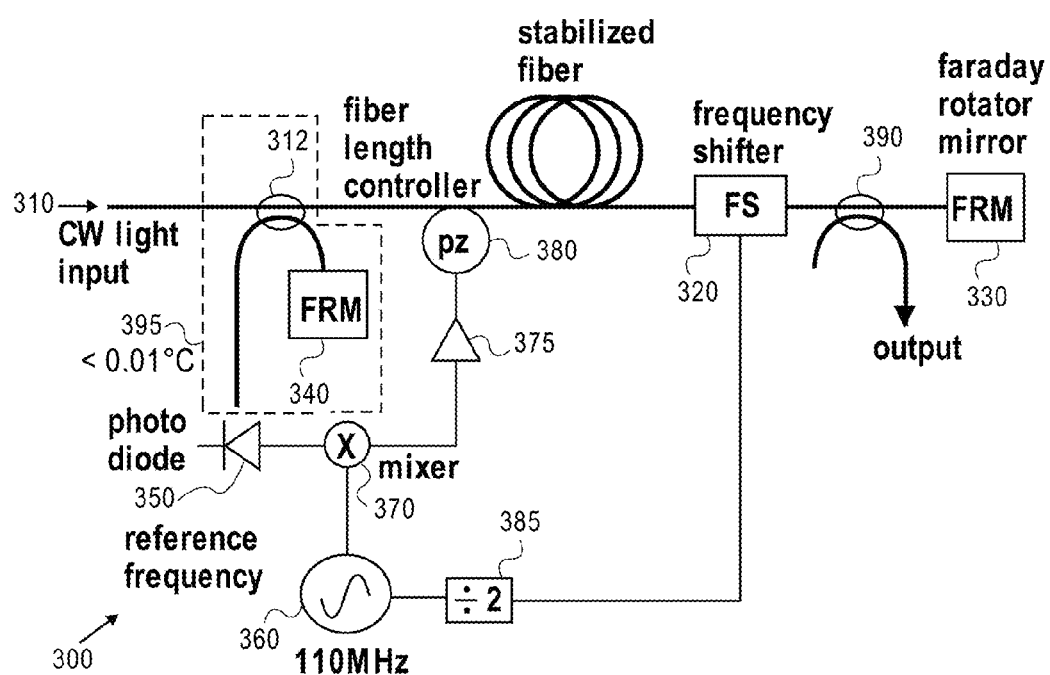
FIG. 3 shows fiber stabilization using an interferometer that employs the fiber as one arm to be compared with a reference arm.

Referring now to FIG. 3 details of the fiber phase stabilization system 300 are shown. The signal from the continuous wave laser enters at 310 where it is split between two arms through a directional coupler 312, and each reflects back from Faraday rotator mirros 330 and 340 to the splitter 312 and to a detector 350, thus forming an unequal arm Michelson interferometer. In one preferred embodiment, the light signal sent through the transport fiber is shifted in frequency by 55 MHz in an acousto-optic frequency shifter 320 at the receiver end, and interfered with the reference arm to produce a 110 MHz difference frequency. This method eliminates spurious signals from intermediate reflections, and allows detection at a high RF frequency where there is lower electrical noise. It has been described elsewhere in relation to radio telescope arrays (Ref. 5). Some of the transmitted signal is reflected, while the rest is passed on to the receiver. In the preferred embodiment, Faraday rotator mirrors 330 and 340 at the ends of the Michelson arms are used to maintain constant polarization at the photodiode 350, so there is no "fading" of the interferometric signal with thermally-induced polarization drift. Stabilization is achieved by using a reference frequency 360 which combines in mixer 370 with the output of the photodiode 350 to provide an amplified signal 375 which in turn controls a piezoelectrically actuated fiber length controller 380. The reference frequency source 360 is also divided by 2 at element 385 to provide control of the frequency shifter 320. Output from the fiber phase stabilization system 300 occurs at directional coupler 390. This output requires polarization control in to be useful, which may be accomplished by adding a polarization controller. Alternatively, the Faraday rotator mirror could be replaced with a polarization controller and normal mirror, as described below.

This fiber stabilization scheme maintains a constant phase delay through the fiber. Since only a single frequency is transmitted in each fiber, timing information is transmitted to laser ML2 240 with constant delay, even though only phase delay is measured. Depending on the length of the fiber, the absolute frequency of the lasers CW1 and CW2 will have to be precisely controlled. Over 100 meters of fiber, say, the frequency must be controlled to within one part in $10^8$, which is easily achievable with an acetylene cell 210 as an absolute reference. For longer fibers, a more precise atomic reference could be used. The reference arm of the Michelson interferometer is the short length of fiber between 312 and 340. This is typically 1 to 2 meters and must be controlled so that its phase delay is constant to within the allowable error of the system. This is achieved by placing a temperature controlled region 395 about the initial control and detection elements 312 and 340, where the temperature is controlled within 0.01° C. The ML1 repetition frequency can also be independently controlled to within one part in $10^8$, accurately transferring the stability of CW1 to CW2 through ML1. With maximum precision of the frequency reference, it is believed that up to 10 km of fiber separation may be achieved.

Figure 4:
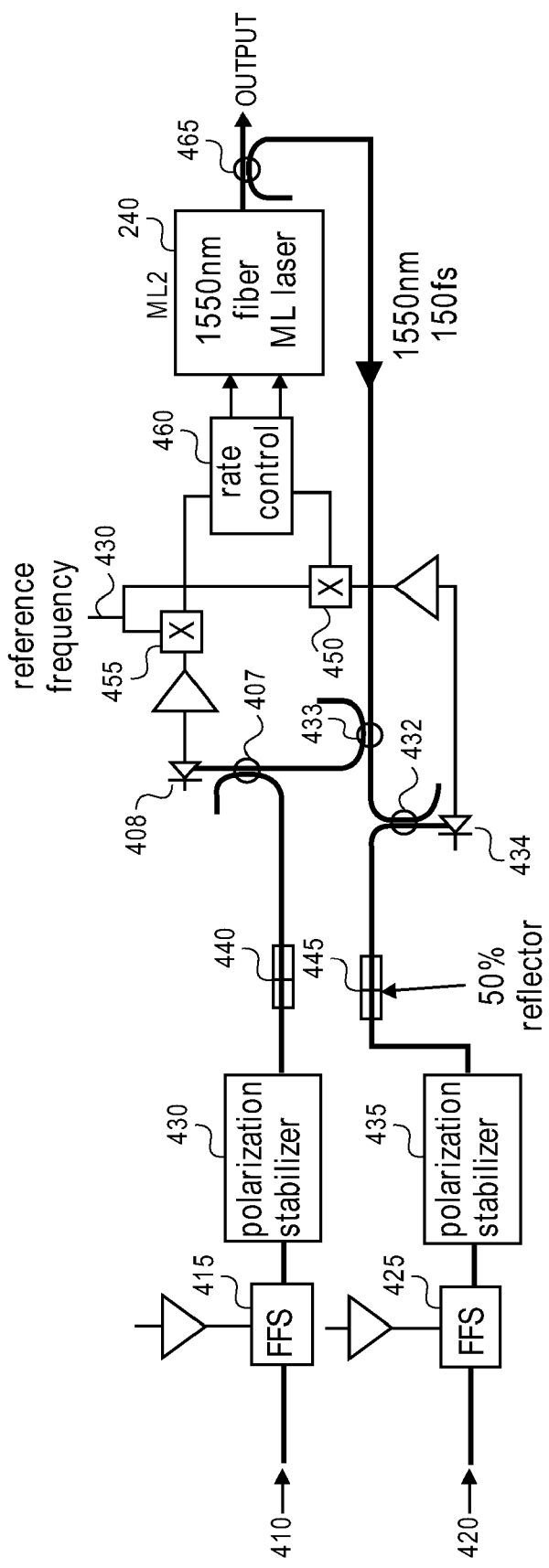
FIG. 4 is a block diagram of the receiver end of the synchronization system, using polarization controllers.

Refer now to FIG. 4, which shows the details of the receiving end of a synchronized laser system 400. Since the transmitted optical signals $\lambda_1$ 410 and $\lambda_2$ 420 from ML1 215 must be interfered with the transmitted optical signals from ML2 240, the polarizations of the optical signals must be controlled. One way to do this is to employ a polarization controller section at the end of the $\lambda_1$ 410 and $\lambda_2$ 420 fibers 206 and 231. This makes the polarization state going into the receiver interferometers constant, providing for a reliable signal even if the polarization changes in the transport fiber.

Refer now to FIG. 4. Once received at the end point, the two frequency signals $\lambda_1$ 410 and $\lambda_2$ 420 are sent into interferometers with light from ML2 240, to gain optical phase information. In a process that is the reverse of the transmission process, two difference frequencies are generated from the mixing of CW1 and CW2 with corresponding comb lines of ML2 on photodiodes. These signals are compared with a local reference 430 common to both and DC control signals are generated to control ML2. Alternatively, the signals from both interferometers may be mixed directly, with no external frequency reference.

There are two ways to control ML2. One way is to derive a difference signal from the two difference frequencies from the interferometers. This single signal can control the repetition rate of ML2. For most situations, the phase of the optical carrier within the pulse envelope of the laser pulses does not matter. Thus phase control of the repetition rate is sufficient. This is equivalent to allowing the frequency combs of FIG. 1 to shift horizontally with respect to one another. However, there can arise a condition where the beat frequencies in the receiver interferometers goes to zero, creating an ambiguity in the control loop and also moving the signal into a region of higher noise. Thus it is advantageous to maintain the interferometric beat frequencies at some fixed value. In this case a second control input to ML2 is required, and this can be a control of the pump power. This input changes the phase accumulation of the pulse per round trip in the cavity (due to the nonlinear effects which mode lock the laser), which changes the offset frequency of the spectral comb, which is what is required. In the preferred embodiment, there are two inputs to ML2 corresponding to the two interferometers. Any offset of the frequency comb of ML1 is thus followed by ML2. This may be an advantage in applications where the two lasers must be added in phase. The electric fields of pulses from multiple lasers can be added in this way, without the lasers being carrier/envelope offset stabilized.

Figure 5:
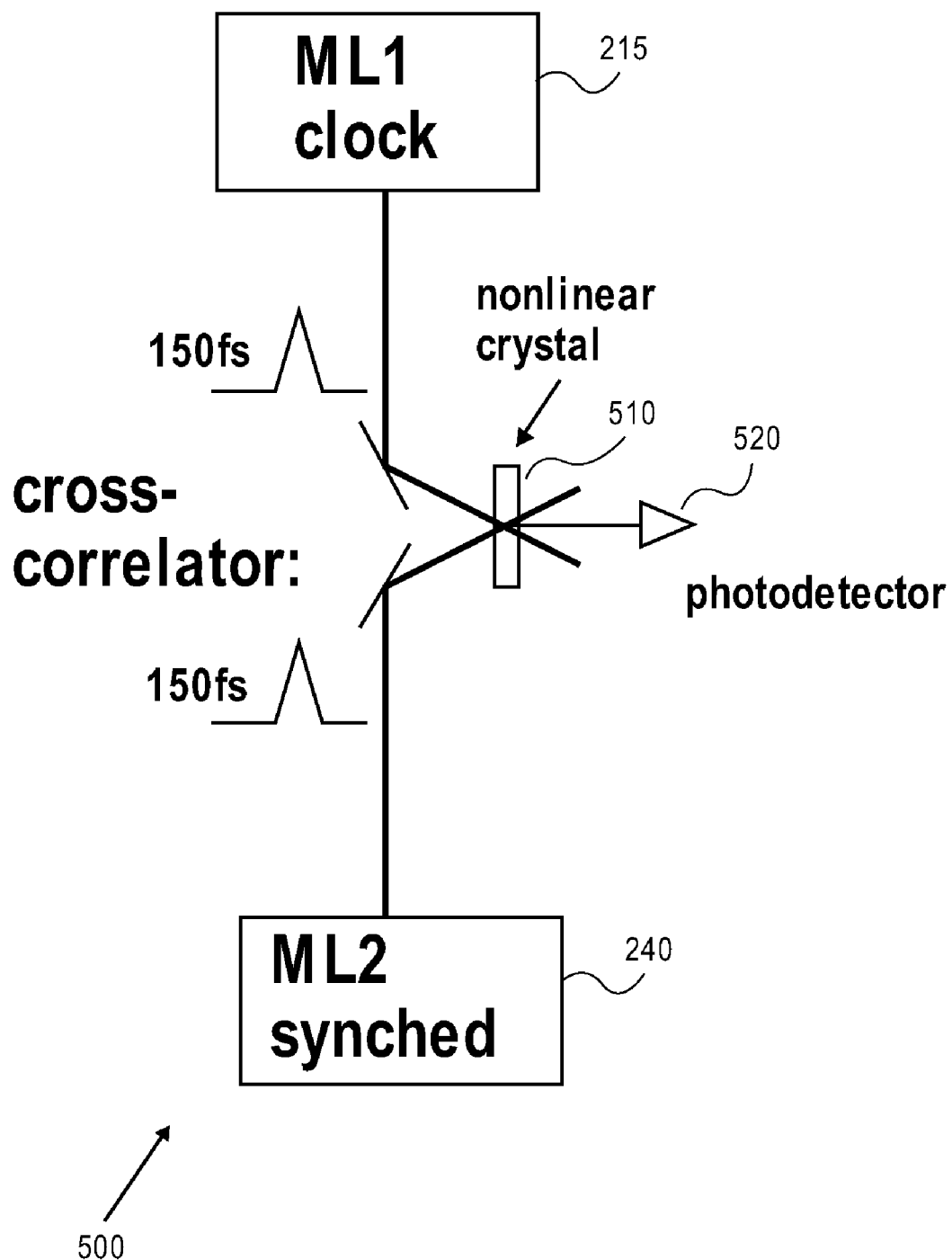
FIG. 5 shows a means for means for determining that the lasers are synchronized.

A simple means 500 for checking that the lasers in close proximity are synchronized is shown in FIG. 5. The two pulses from ML1 215 and ML2 240 are cross-correlated in a nonlinear crystal 510 and the overlap is monitored by detecting in a photodetector 520 the strength of the optical sum frequency signal. This test simulates the application requiring synchronization, which may have any other time-sensitive process that requires simultaneity of the laser pulses.

Figure 6A:
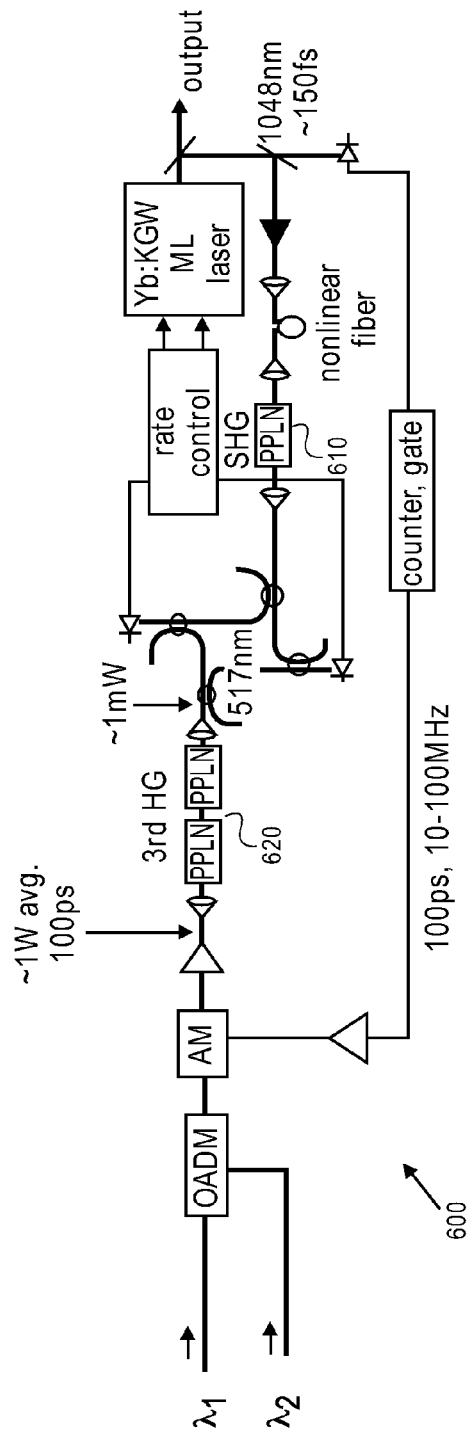
FIG. 6A shows a way to synchronize a fiber laser at 1550 nm with a ytterbium tungstate laser at 1048 nm.

Refer now to FIG. 6A. Even though the preferred embodiment employs two mode locked fiber lasers as ML1 and ML2, it is possible to use different lasers at different wavelengths. For instance, if ML1 is a fiber laser (chosen for its low phase noise), ML2 could be a titanium sapphire TiSaf laser or a ytterbium tungstate Yb:KGW laser or some other pulsed laser. It is only necessary to frequency convert (through a third harmonic generator, for instance) the comb lines of the two lasers to make them the same so they can be compared interferometrically.

In FIG. 6A a 1048 nm ytterbium tungstate laser system 600 is being synchronized. Pulses from this laser are frequency doubled (through a harmonic generator 610) to produce 524 nm wavelengths, while the 1550 nm signals from the synchronization system are frequency tripled in nonlinear crystals 620 to the same wavelength range. In this case the CW1 and CW2 signals are pulse modulated to make frequency tripling more efficient. Frequency overlap with ML2 in the interferometer is helped by the fact that the bandwidth is tripled also. The interferometer would work at 524 nm and derive the necessary error signals to control this ML2. It is believed that other methods of frequency conversion could be used to match nearly any two pulsed lasers using variations of these methods.

Figure 6B:
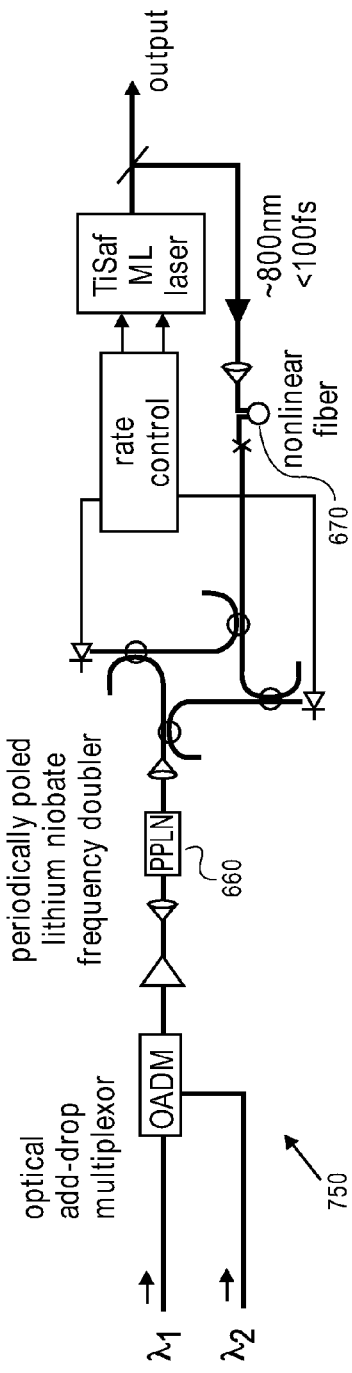
FIG. 6B shows a way to synchronize a fiber laser at 1550 nm with a titanium sapphire laser at 800 nm.

FIG. 6B shows a way 650 to synchronize a fiber laser at 1550 nm with a titanium sapphire laser at 800 nm. The ~1550 nm wavelengths are doubled in a nonlinear crystal 660 (a periodically poled lithium niobate frequency doubler) after amplification, yielding ~775 nm. The bandwidth of the titanium sapphire laser may have to be increased in a nonlinear fiber 670, but phase coherence of the resulting new comb lines is maintained. The subsequent interferometer is thus comparing comb lines at 775 nm and deriving the same synchronization information as described above.

Figure 7:
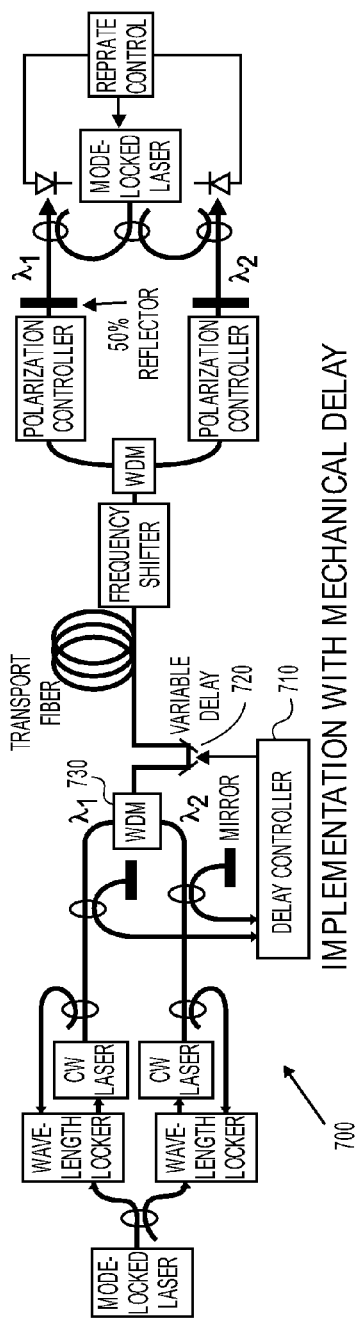
FIG. 7 shows a method of controlling relative timing between the lasers through the use of a mechanical delay.
Figure 8:
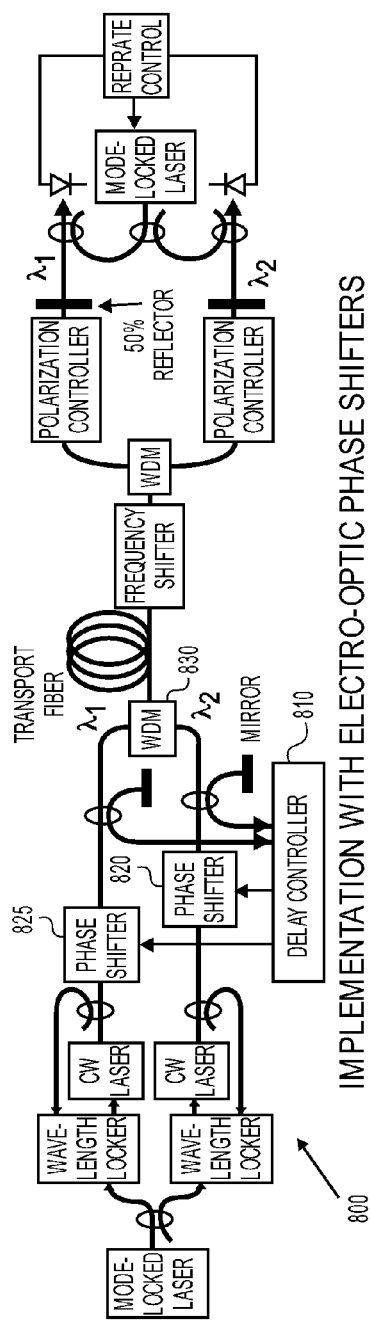
FIG. 8 shows a method of controlling relative timing between the lasers signals through the use of two electro-optical phase shifters.

Referring now to FIGS. 7 and 8, alternate implementations of controlling the time delay through the synchronization system are described.

Here, one can make adjustments to the timing sent to the second laser by adjusting only the phase of the optical signals in the two lines. Previously, a mechanical stretcher was used to change the length of the fiber to adjust the timing between lasers. This can be replaced with a purely electro-optic device, or an acousto-optic device. In the electro-optic case, there are optical "in-phase and quadrature" (IQ) phase modulators which can roll the phase of an optical signal at any rate from DC to several GHz. These can be used to control the two optical signals before they are combined on one fiber, or transmitted on two separate fibers. Rather than changing the length of the transmission fiber in order to control delay, the optical phase is shifted electronically to shift the synchronization of the controlled laser. The interferometric signal delivered to the delay controller 810 determines input signals to the phase shifters 820 and 825, to control each wavelength $\lambda_1$ and $\lambda_2$ independently. Thus the mechanical variable delay 720 is eliminated, increasing reliability and control bandwidth. With higher control bandwidth, higher frequency perturbations on the transport fiber can be removed. Also, the phase shifters 820 and 825 can introduce an arbitrary amount of phase shift, while the range of mechanical delays is limited. This way of controlling delay is possible because the time information is transmitted to the synchronized laser using only optical phase.

Refer now to FIG. 7, where an implementation with a mechanical delay is depicted 700. Here, a delay controller 710 adjusts a variable delay device 720 after the two wavelengths $\lambda_1$ and $\lambda_2$ are combined in a wavelength division multiplexer 730.

Refer now to FIG. 8. Here, the delay controller 810 controls independent phase shifters 820 and 825, one for each of the two wavelengths to be combined in the wavelength division multiplexer 830.

REFERENCES

1. J. Frisch, D. Bernstein, D. Brown and E. Cisneros, "A High-Stability, Low Noise RF Distribution System", Proceedings of the 2001 Particle Accelerator Conference, Chicago, p. 816.
2. F. X. Kaertner, F. O. Ilday, J. Kim, A. Winter, F Grawert, H. Byun and J. Chen, "Progress in Large-Scale Femtosecond Timing Distribution and RF-Synchronization", Proceedings of the 2005 Particle Accelerator Conference, Knoxville, p. 284.
3. R. K. Shelton, S. M. Foreman, L-S Ma, J. L. Hall, H. C. Kapteyn, M. M. Murnane, M. Notcutt and J. Ye, "Subfemtosecond Timing Jitter Between Two Independent, Actively Mode-locked Lasers", Opt. Lett. 27, p. 312 (2002).
4. A. Bartels, S. A. Diddams, T. M. Ramond, and L. Holberg, "Mode-locked Laser Pulse Trains with Subfemtosecond Timing Jitter Synchronized to an Optical Reference Oscillator", Opt. Lett. 28, p. 663 (2003).
5. J. Payne and B. Shillue, "Photonic Techniques for Local Oscillator Generation and Distribution in Millimeter-wave Radio Astronomy", Proc. MWP, p. 9 (2002).

CONCLUSION

All other documents attached to and referred to within this application are deemed to be incorporated by reference.

What is claimed is:

1. A high accuracy optical synchronization system comprising:
   a) an input laser system capable of generating an input laser signal, with an associated input laser signal frequency, from a first continuous wave laser and a second continuous wave laser located environmentally independent of the first continuous wave laser; and
   b) means for synchronizing within a few femtoseconds the input laser signal among a plurality of synchronized lasers,
   wherein the means for synchronizing comprises:
      a) locking a first wavelength $\lambda_1$ to a first frequency component of the input laser system signal to the first continuous wave laser operating at wavelength $\lambda_1$;
      b) locking a second wavelength $\lambda_2$ to a second frequency component of the input laser system signal to the second continuous wave laser operating at wavelength $\lambda_2$; and
      c) transmitting to one or more distant laser systems to be temporally locked to the input laser system:
         i) a $\lambda_1$ output from the first continuous wave laser operating at wavelength $\lambda_1$ and
         ii) a $\lambda_2$ output from the second continuous wave laser operating at wavelength $\lambda_2$.

2. The high accuracy optical synchronization system of claim 1, wherein
   a) the few femtoseconds are selected from one or more of a set of:
      i) <1 fs, 1.±.0.25 fs, and 1-10 fs.

3. The high accuracy optical synchronization system of claim 1, wherein the distant laser systems are at a distance selected from a group of distance consisting of:
   a) >100 m, >1 km, >3 km, >4 km, >6 km, and >10 km.

4. The high accuracy optical synchronization system of claim 3, comprising:
   a) controlling a temporal skew between the input laser system and one or more of the synchronized lasers by temporally shifting the $\lambda_1$ output and the $\lambda_2$ output through:
      i) a mechanical delay system; or
      ii) an electro optical phase shifter system.

5. The high accuracy optical synchronization system of claim 1, wherein the transmitting step comprises: a) combining the $\lambda_1$ output and the $\lambda_2$ output into a single fiber for remote transmission.

6. The high accuracy optical synchronization system of claim 1, wherein the transmitting step comprises:
   a) transporting the $\lambda_1$ output and the $\lambda_2$ output with two separate fibers for remote transmission.

7. An apparatus capable of performing the step of the high accuracy optical synchronization system of claim 1.

8. A high accuracy optical synchronization system comprising:
   a) an input laser system capable of generating an input laser signal, with an associated input laser signal frequency, from a first continuous wave laser and a second continuous wave laser located environmentally independent of the first continuous wave laser; and
   b) a system that synchronizes within a few femtoseconds a plurality of discrete frequencies phase locked to the input laser signal comb frequencies among a plurality of independently located devices with a temporal offset,
   wherein the system that synchronizes comprises:
      a) a first phase lock for a first wavelength $\lambda_1$ to a first frequency component of the input laser signal system to the first continuous wave laser operating at wavelength $\lambda_1$;
      b) a second phase lock for a second wavelength $\lambda_2$ to a second frequency component of the input laser signal system to the second continuous wave laser operating at wavelength $\lambda_2$; and c) a laser output transmitted to one or more distant laser systems to be temporally locked to the input laser comprising:
  i) a $\lambda_1$ output from the first continuous wave laser operated at wavelength $\lambda_1$ and
  ii) a $\lambda_2$ output from the second continuous wave laser operated at wavelength $\lambda_2$.

9. The high accuracy optical synchronization system of claim 8, wherein the temporal offset is no temporal offset.

10. The high accuracy optical synchronization system of claim 8, wherein
  a) the few femtoseconds are selected from one or more of a set of:
  i) <1 fs, 1.+−.0.25 fs, and 1-10 fs.

11. The high accuracy optical synchronization system of claim 8, wherein the distant laser systems are at a distance selected from a group of distance consisting of: a) >100 m, >1 km, >3 km, >4 km, >6 km, and >10 km.

12. The high accuracy optical synchronization system of claim 8, wherein the laser output comprises:
  a) a combination of the $\lambda_1$ output and the $\lambda_2$ output into a single fiber for remote transmission.

13. The high accuracy optical synchronization system of claim 8, wherein the laser output comprises:
  a) a transport of the $\lambda_1$ output and the $\lambda_2$ output with two separate fibers for remote transmission.

14. The high accuracy optical synchronization system of claim 8, comprising:
  a) a temporal skew control between the input laser and one or more of the synchronized lasers by temporally, whereby the $\lambda_1$ output and the $\lambda_2$ outputs are shifted through:
  i) a mechanical delay system; or
  ii) an electro optical phase shifter system.

* * * * *